United States Patent [19]

Pichon

[11] Patent Number: 5,108,161
[45] Date of Patent: Apr. 28, 1992

[54] HYDRAULIC BRAKING CIRCUIT FITTED WITH A WHEEL-ANTILOCK DEVICE FOR A MOTOR VEHICLE

[75] Inventor: Jean-Michel Pichon, Messy, France

[73] Assignee: Bendix Europe Services Techniques, Drancy, France

[21] Appl. No.: 587,318

[22] Filed: Sep. 24, 1990

[30] Foreign Application Priority Data

Sep. 29, 1989 [FR] France ................................ 89 12809

[51] Int. Cl.$^5$ ................................................ B60T 8/42
[52] U.S. Cl. ......................... 303/115 R; 303/116 SP; 303/84.2; 303/DIG. 2
[58] Field of Search ............ 303/115 R, 116 SP, 84.1, 303/84.2, DIG. 1, DIG. 2

[56] References Cited

U.S. PATENT DOCUMENTS

| Re. 31,387 | 9/1983 | Bayliss | 303/115 R |
|---|---|---|---|
| 4,627,671 | 12/1986 | Matsui et al. | 303/116 |
| 4,685,749 | 8/1987 | Otsuki et al. | 303/84.2 X |
| 4,784,444 | 10/1988 | McCann et al. | 303/111 X |
| 4,798,422 | 1/1989 | Becker | 303/DIG. 2 |

FOREIGN PATENT DOCUMENTS

| 0181156 | 5/1986 | European Pat. Off. |  |
|---|---|---|---|
| 0252789 | 1/1988 | European Pat. Off. |  |
| 3538839 | 5/1986 | Fed. Rep. of Germany |  |
| 2611630 | 9/1988 | France |  |
| 60-236859 | 11/1985 | Japan |  |
| 0026153 | 2/1987 | Japan | 303/116 SP |
| 63-162358 | 7/1988 | Japan |  |
| 2183763 | 6/1987 | United Kingdom |  |
| 2194010 | 2/1988 | United Kingdom |  |
| 2199385 | 7/1988 | United Kingdom |  |

Primary Examiner—Matthew C. Graham
Assistant Examiner—Lee W. Young
Attorney, Agent, or Firm—Larry J. Palguta; Ken C. Decker

[57] ABSTRACT

The hydraulic braking circuit is fitted with a master brake cylinder controlled by a brake pedal and with a wheel-antilock device, for a motor vehicle. This device comprises a pressure generator (20), which is started up at the beginning of an antilock-braking sequence, for selectively supplying at least one wheel brake (5, 6), and a member for automatically isolating the wheel brake (5, 6) from the master brake cylinder (1) when the pressure generator is started up by bringing the wheel brake into communication with means for storing the brake fluid, means are provided for limiting the pressure of the hydraulic fluid provided by the pressure generator to a value which is function of the jamming pressure.

4 Claims, 1 Drawing Sheet

HYDRAULIC BRAKING CIRCUIT FITTED WITH A WHEEL-ANTILOCK DEVICE FOR A MOTOR VEHICLE

BACKGROUND OF THE INVENTION

The present invention relates to a hydraulic braking circuit fitted with a master brake cylinder and a wheel-antilock device for a motor vehicle and, more particularly, to a circuit of this type fitted with means for isolating wheel brakes from the master brake cylinder during the operation of the antilock device.

FR-A-2,611,630 describes a braking circuit of this type comprising a master brake cylinder actuated by a servo-brake controlled by a pedal, a brake associated with each wheel of the vehicle, a solenoid valve for closing the braking circuit under normal conditions and, under the control of the antilock device, for relieving the pressure in a wheel brake by placing the latter in communication with means for storing the brake fluid of the circuit. In addition to means making it possible to filter out reactions which are unpleasant for the driver on the brake pedal during the operation of the antilock device, the circuit comprises a controlled valve which is sensitive to the relief of the pressure in the wheel brake in order to release the closure of the supply circuit of this brake by a restriction which slows down the rise in pressure of the fluid in the circuit. Phases of slow pressure rises of this type occur during the operation of the antilock device, as is well known.

The circuit described in the above-mentioned document meets the stated objectives but, nevertheless, has some disadvantages. During the operation of the antilock device, the level of noise from the high-pressure delivery pump may become very considerable. Moreover, the pressure variations are returned to the master brake cylinder and give rise to pulsations of the brake pedal, a phenomenon which is difficult to control. Lastly, it has been noticed that, during the operation of the antilock device, fluctuations in pressure occur in the phases of a rise in pressure, fluctuations which are felt by the master brake cylinder, and hence the brake pedal.

SUMMARY OF THE INVENTION

The object of the present invention is to produce a hydraulic braking circuit fitted with a master brake cylinder and with a wheel-antilock device which does not have these disadvantages.

This object of the invention, as well as others which will emerge from the present description below, is achieved with a hydraulic braking circuit fitted with a master brake cylinder controlled by a brake pedal and with a wheel-antilock device, for a motor vehicle, this device comprising a pressure generator, which is started up at the beginning of an antilock-braking sequence, for selectively supplying at least one wheel brake, and a member for automatically isolating the wheel brake from the master brake cylinder when the pressure generator is started up by bringing the wheel brake into communication with means for storing the brake fluid, characterized in that it comprises means for limiting the pressure of the hydraulic fluid provided by the pressure generator, which is a function of the last pressure which existed in the wheel brake before the first relief, also known as jamming pressure. The noise of the high-pressure pump is thus itself be limited, and the variations in pressure at the outlet of the pressure generator is minimized.

According to an advantageous feature of the invention, the means for limiting the pressure of the hydraulic fluid consist of a slide distributor, comprising a slide which can move between first and second pressure chambers which are connected to the pressure generator and to a pressure-memorization device respectively so that the movable slide is displaced between a first and second position under the influence of the differential pressure established between the first and second chambers in order to establish the communication between the pressure generator and the means for storing the brake fluid.

The slide distributor thus at all times compares the jamming pressure and the pressure provided by the pressure generator, and is opened when the latter is greater than the first in order to connect the outlet of the pressure generator to means for storing the brake fluid, with the result that the pressure in the remainder of the braking circuit can no longer increase.

It will advantageously be possible for second storing means to be connected to the pressure generator when the slide occupies its second position.

BRIEF DESCRIPTION OF THE DRAWINGS

Other features and advantages of the present invention will emerge from the following description of an embodiment given by way of example and with no limitation being implied, made with reference to the attached drawings, in which.

DETAILED DESCRIPTION OF THE INVENTION

Figure 1:
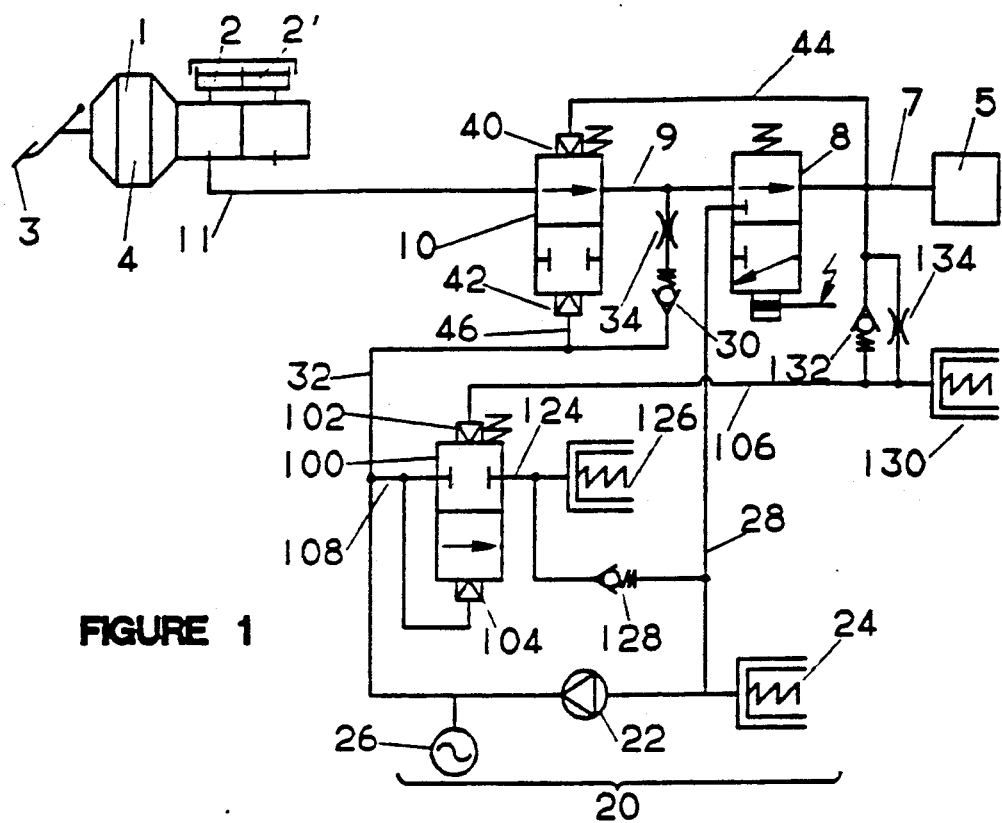
FIG. 1 is a diagram of an embodiment of the braking circuit according to the invention.

The braking circuit shown in FIG. 1 comprises, in the traditional manner, a "tandem" master brake cylinder 1 with two control chambers supplied by fluid reservoirs 2,2' and controlled by a brake pedal 3, optionally via a servo-brake 4, in order to supply at least one wheel brake 5.

The wheel brake 5 is joined by a supply line 7 to a three-way two-position solenoid valve 8, itself connected by a line 9 to a controlled valve 10 which is, in turn, connected to the master brake cylinder 1 by a line 11.

During normal braking the wheel brake 5 is thus controlled by the master brake cylinder through the controlled valve 10, and through the solenoid valve 8, then placed in the position shown in the figure where this solenoid valve establishes communication between the lines 7 and 9.

The solenoid valve 8 forms part of a wheel-antilock device incorporated in the braking circuit according to the invention. This antilock device also comprises a pressure generator 20 which comprises a pump 22, optionally inserted between a low-pressure reservoir 24 and a high-pressure accumulator 26 placed at the outlet of the pump. The antilock device selectively controls the energizing of the solenoid valve 8 in order to cause the latter to move into its "relief" position where it establishes a communication between the lines 7 and 28 so that the fluid contained in the wheel brake may run into the low-pressure reservoir 24, thus causing the pressure in the wheel brake to fall. The high-pressure outlet of the pump is connected to the line 9 for supplying the solenoid valve 8 through a non-return flap 30 by a line 32 in which a restriction 34 is introduced. The non-return flap 30 closes during periods of normal braking and isolates the circuit formed by the lines 11, 9 and 7, and opens during periods of operation of the antilock device. The restriction 34 is connected to the line 9 which joins the solenoid valve 8 to the controlled valve 10.

The controlled valve 10 comprises first and second pressure chambers 40, 42 respectively joined by lines 44, 46 to the supply line 7 of the wheel brake 5 and to the high-pressure outlet of the generator 20 respectively. A slide can move in the controlled valve between the chambers 40 and 42 under the action of the pressure difference prevailing in these chambers.

When the pressure generator 20 is started up by the antilock device, the pressure created, still greater than that prevailing in the supply lines of the brakes, pushes the slide back in order to prevent any communication between the master brake cylinder 1 and the remainder of the braking circuit.

During the entire period of operation of the antilock device, the master brake cylinder 1 is thus isolated from the remainder of the circuit, the pressure of the brake fluid in the wheel brake 5 being controlled only by the antilock device via the solenoid valve 8 and the pump 22.

It is consequently desirable that the pressure provided by the pressure generator be as constant as possible and be limited so as not to cause excessive consumption of hydraulic fluid.

In order to do this, according to the invention, it is provided for the pressure of the brake fluid provided by the pressure generator to be limited so that the antilock device operates for slightly longer periods of time, but under a less considerable pressure than with the known systems.

As shown in the figures, a distributor 100 is arranged in a circuit between the outlet of the pressure generator 20 and the line 7. To be more accurate, the distributor 100 comprises first and second pressure chambers 102, 104, joined by lines 106, 108 respectively to the supply line 7 of the wheels brake 5 and to the high-pressure outlet of the generator 20 respectively.

Figure 2:
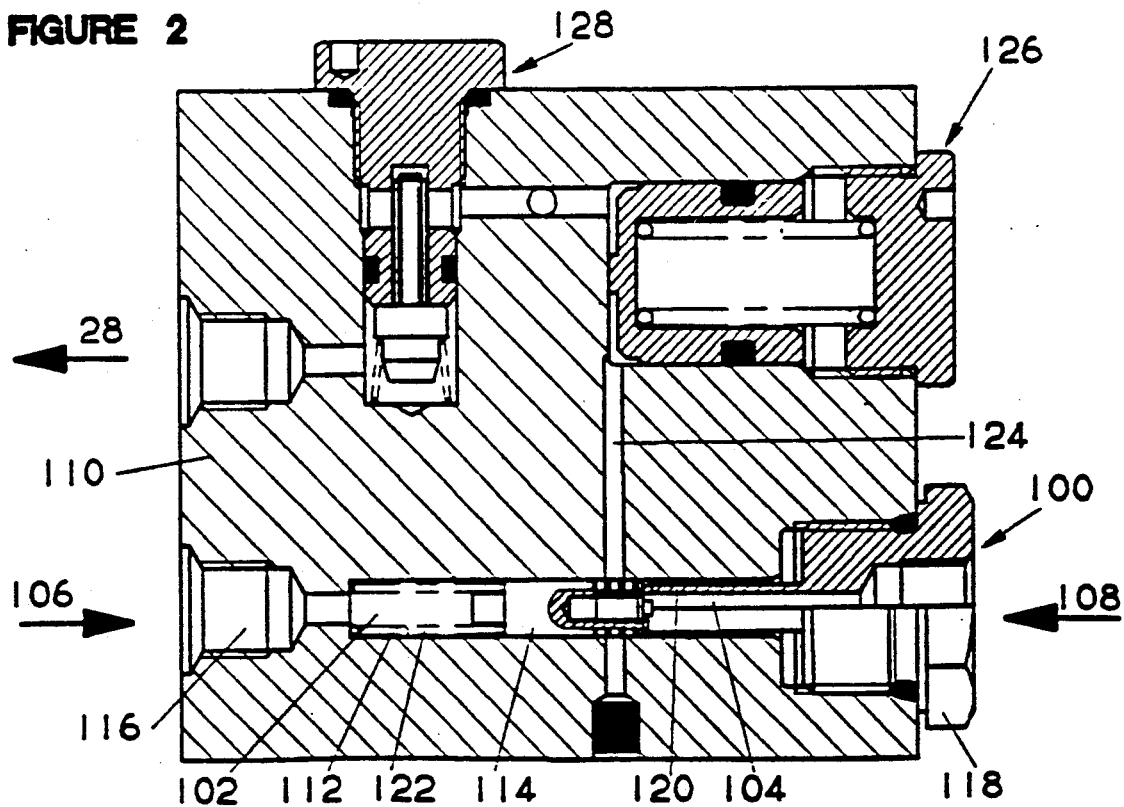
FIG. 2 is a sectional view of a part of the circuit in FIG. 1.

As can be seen better in FIG. 2, the distributor 100 is formed in a body 110 bored through by a bore 112 in which a slide 114 slides tightly. The slide 114 defines, in the bore 112, the first pressure chamber 102, connected by a connection piece 116 to the line 106. The bore 112 receives, on the other side of the slide 114, a coupling plug 118 for joining to the line 108, the coupling plug 118 being extended inside the bore 112 by a hollow sleeve 120. The inside of the sleeve 120 defines the second pressure chamber 104, the sleeve 120 also acting as a stop for the slide 114, which is subjected to the action of a spring 122 in the first pressure chamber 102.

A passage 124 made in the body 110 opens out into the bore 112 such that the slide 114 interrupts the communication between the second chamber 104 and the passage 124 when it is in its rest position illustrated in FIG. 2, and such that it allows this communication when it is pushed towards the left in FIG. 2.

A pressure-memorization device 130, for example the type described in EP-A-0,252,789, is connected to the line 106, as well as a non-return flap 132 and a restriction 134 connected in parallel to the line 7. This device is thus continuously subjected to the pressure prevailing in the wheel brake 5, which it communicates to the control chamber 102 through the line 106.

The operation of the braking circuit according to the invention will now be described. During normal braking, the solenoid valve 8, the controlled valve 10 and the distributor 100 each occupy the position illustrated in FIG. 1, with the result that the wheel brake 5 is actuated directly by the master brake cylinder 1 via the line 11, the controlled valve 10 in the through position, the line 9, the solenoid valve 8 in the through position and the line 7.

It is known that a wheel-antilock device of a vehicle has speed sensors for these wheels and a computer which compares the peripheral speeds of the wheels to the speed of the vehicle in order to calculate therefrom the imminence of a situation where at least one of the wheels of the vehicle locks. The computer then responds by sending switching orders to the solenoid valve 8 so as to modulate the pressure in the wheel brakes to prevent the occurrence of this locking situation resulting from an excessively powerful action by the driver on the brake pedal, the coefficient of friction at the wheel/road interface, which depends greatly on the condition of the road, as well as the degree of wear of the type of the wheel, being taken into consideration.

In such a situation of imminent locking of a wheel of the vehicle, the first rise in pressure takes place as in normal braking. During this first rise in pressure, the computer orders, at a predetermined moment, the energizing of the solenoid valve which is associated with the wheel whose locking is imminent and which then passes into its "relief" position, in which the solenoid valve brings the lines 7 and 28 into communication whilst at the same time breaking off the former direct communication between the lines 7 and 9. Bringing the lines 7 and 28 into communication enables the brake fluid contained in the wheel brake 5 to run into the line 28 in order to rejoin the low-pressure reservoir 24 situated at the inlet of the pump 22. A release of the pressure in the brake then follows and, simultaneously, start-up of the pump 22, ordered by the computer. Since the pressure established by the pump in the line 46 for supplying the chamber 42 of the controlled valve 10 is then greater than the pressure in the line 7, placed in communication with the chamber 40 of the controlled valve 10 by the line 44, the slide is displaced, blocking the passage which previously placed in communication the line 11 and the line 9 in order to isolate the master brake cylinder 1 from the remainder of the braking circuit.

An antilock-braking sequence traditionally has a series of reliefs of pressure alternating with slow rises. At the end of a relief, the computer breaks off the energizing of the solenoid valve 8 in order to establish communication between the lines 7 and 32. The wheel brakes are then supplied once more by fluid pressurized by the generator 20 and passing into the line 7 by the line 32, the non-return flap 30 and the restriction 34, the master brake cylinder 1 remaining isolated from the remainder of the braking circuit since the controlled valve 10 blocks at all times the passage between the lines 11 and 9, the pressure in the chamber 42 being greater than that in the chamber 40 as a result of the presence of the restriction 34.

During the relief phases, the solenoid valve 8 is energized and passes into its "relief" position in the same way as after the first rise in pressure, the only difference being that the pressure generator 20 is already operating and that a pressure equal to the last pressure which existed in the wheel brake 5 just before the first release, more commonly known as jamming pressure, prevails in the pressure-memorization device 130. This jamming pressure is communicated to the control chamber 102 of the distributor 100 by the line 106. The pressure in the circuit formed by the lines 9 and 32 will increase rapidly during these relief phases, but will be transmitted simultaneously to the line 108 and the chamber 104. As soon as the pressure in the chamber 104 exerts on the section of the slide 114 a force greater than that which is exerted by the pressure in the chamber 102, equal to the jamming pressure, increased by the force exerted by the spring 122 on the opposite surface of the slide 114, the latter is displaced and opens the communication between the lines 108 and 124, thus enabling the excess pressure to be relieved towards the low-pressure space 24.

In cases where it is preferable for the low-pressure reservoir 24 not to have too large a size, it will advantageously be possible to provide a second low-pressure space 126 on the line 124. So that this space is always available to absorb unwanted surges in pressure, it will be possible, also advantageously, to arrange a non-return flap 128 on the line 124 to prevent the space 24 from discharging into the space 126.

A compact system will be obtained by integrating several components into a single-piece structure, such as that shown in FIG. 2 where the slide distributor 100, the low-pressure space 126 and the non-return flap 128 are arranged in bores made in the same body, joined by passages and connected to the lines of the braking circuit by connection pieces.

When, as a result of the successive reliefs, interspersed with slow pressure rises obtained as a result of the restriction 34, the computer of the antilock device detects that the sliding between the wheel of the vehicle and the road has disappeared, the computer breaks off the energizing of the pump 22, the pressure in the line 32 and the chamber 42 falls and the slide of the controlled valve 10 returns to the position where it frees the passage in order to establish direct communication between the master brake cylinder and the supply line 7 of the brake 5 and thus to reestablish the circuit in its normal-braking configuration. The pressure in the pressure-memorization device may then decrease as a result of the restriction 134, the lines 7, 9 and 11 leading to the reservoir 2 via the master brake cylinder 1 in the rest position.

With the braking circuit according to the invention the pressure in the line 32 is during the operation of the antilock device at all times greater than the pressure in the line 7 as a result of the presence of the restriction 34 situated between them. It follows that the pressure in the control chamber 42 is at all times greater than the pressure in the chamber 40 and that the controlled valve 10 then remains in the position in which it interrupts the communication between the lines 9 and 11. Any increase in pressure in the line 9, and hence in the line 7, which could trip the controlled valve in its through position is prevented by the slide distributor 100 which continually compares the jamming pressure with the pressure issuing from the pressure generator. Any difference between these pressures exerted on each side of the slide 114 capable of overcoming the force of the spring 122 will cause the slide 114 to move in the direction where it brings the outlet of the pressure generator 20 into communication with the low-pressure space 126, itself capable in turn of discharging into the low-pressure space 24.

In other words, the pressure at the outlet of the pressure generator will at all times be limited to a value dependent on the jamming pressure, increased by the pressure required to overcome the force exerted by the spring 122.

A braking circuit has thus been produced by way of the invention, which is fitted with a wheel-antilock device and in which, during the operation of this device, the master brake cylinder is completely isolated from the remainder of the circuit and in which the brake pedal is not subject to any vibration. Moreover, the pressure points at the outlet of the pressure generator are absorbed by a second low-pressure space, resulting in a substantial decrease in the noise level. Lastly, the pressure delivered by the pressure generator is limited to a value which is a function of the jamming pressure and of the stiffness of the spring 122, with the result that the consumption of brake fluid is limited to that strictly necessary for the satisfactory operation of the antilock device.

The invention is, of course, not limited to the embodiment described and shown, which has only been given by way of example. In particular, the invention may also be applied to a circuit including several slide distributors and several pressure generator circuits in order to ensure an entirely independent control of the various wheels of the vehicle, although at the cost of making the vehicle more complex.

What we claim is:

1. A hydraulic braking circuit including a master brake cylinder controlled by a brake pedal and with a wheel-antilock device, for a motor vehicle, the device comprising a pressure generator, which is started up at the beginning of an antilock-braking sequence, for selectively supplying at least one wheel brake, a member for automatically isolating the wheel brake from the master brake cylinder when the pressure generator is activated, a member bringing the wheel brake into communication with means for storing hydraulic fluid, means for limiting the pressure of the hydraulic fluid provided by the pressure generator to a value equal to a jamming pressure increased by a predetermined pressure, and a pressure-memorization device connected to the wheel brake, the limiting means comprising a slide distributor having a movable slide which can move between first and second pressure chambers which are connected to the pressure generator and to the pressure-memorization device, respectively, so that the movable slide is displaced between first and second positions under the influence of a differential pressure established between the first and second pressure chambers in order to establish communication between the pressure generator and the means for storing hydraulic fluid.

2. The circuit according to claim 1, wherein a spring placed in the second pressure chamber loads the movable slide in the first position.

3. The circuit according to claim 1, wherein second means for storing hydraulic fluid is connected to the pressure generator when the movable slide is in the second position.

4. The circuit according to claim 3, wherein a non-return flap is arranged between the storing means and the second storing means to prevent communication of the storing means with the second storing means.

* * * * *